United States Patent [19]
Depcrymski

[11] 3,792,187
[45] Feb. 12, 1974

[54] VOLTAGE GRADING SHIELD FOR SHARP ANGLE TRANSITION JOINT

[75] Inventor: John J. Depcrymski, Greensburg, Pa.

[73] Assignee: I.T.E. Imperial Corporation, Spring House, Pa.

[22] Filed: May 21, 1973

[21] Appl. No.: 362,323

[52] U.S. Cl............. 174/21 C, 174/87, 285/133 R, 285/179, 285/286
[51] Int. Cl......................... H02g 15/24, H01b 9/04
[58] Field of Search . 174/21 C, 21 CA, 71 R, 71 C, 174/87; 285/133 R, 179, 286; 333/98 BE

[56] References Cited
UNITED STATES PATENTS

| | | | |
|---|---|---|---|
| 958,316 | 5/1910 | Rogers et al.................. | 285/179 X |
| 1,077,741 | 11/1913 | Neveu............................ | 285/179 X |
| 3,546,356 | 12/1970 | Graybill et al................... | 174/21 C |
| 3,569,606 | 3/1971 | Clin............................. | 174/21 C X |

Primary Examiner—Laramie E. Askin
Attorney, Agent, or Firm—Ostrolenk, Faber, Gerb & Soffen

[57] ABSTRACT

A sharp angle transition joint for rigid coaxial gas-insulated systems is provided by an oval ring formed from a flat strip of conductive material. The ring overlaps the mitered spaced parallel edges of two concentric, outer housings and is welded to the edges of the housings.

11 Claims, 3 Drawing Figures

PATENTED FEB 12 1974 3,792,187

VOLTAGE GRADING SHIELD FOR SHARP ANGLE TRANSITION JOINT

BACKGROUND OF THE INVENTION

This invention relates to gas-insulated, high voltage power transmission systems, and more particularly relates to a novel structure for permitting a direction change of the bus without introducing expensive parts or highly stressed regions within the bus.

Gas-insulated power transmission systems are well known wherein a central power conductor for each phase is housed within a respective outer grounded elongated enclosure. Suitable insulator spacers mounted along the length of the system support the central conductor within the outer housing. The outer housing is then filled with a suitable dielectric gas, such as sulfur hexafluoride under some pressure greater than atmospheric pressure. Bus of this type is used in extremely high voltage applications, for example, for the transmission of electrical power at voltages of 230 KV and above.

It frequently becomes necessary for the relatively rigid, coaxial bus constructed as outlined above to make changes in direction. When the bus makes a change in direction, caution must be exercised to prevent the formation of regions of high local dielectric stress within the gas. Thus, carefully arranged concentric spheres have been formed on the bus and on the outer housing at the point where the bus changes direction in order to control the electrostatic field within the housing to prevent gas breakdown as described in U.S. Pat. No. 3,546,356 in the name of Graybill et al.

When using concentric spheres in this manner, extremely good control is achieved over the dielectric field and directional change is made in a relatively low stressed area. The use of the concentric sphere arrangement, however, can be expensive since it requires the manufacture of complexly shaped parts which do not easily lend themselves to simple machining and assembly techniques.

BRIEF DESCRIPTION OF THE INVENTION

In accordance with the present invention, directional changes of extra-high voltage bus are made by simply cutting the grounded housings at suitable angles relative to one another to accommodate the necessary direction change and to space the housing ends by a gap of some given constant spacing. An insert formed of a flat strip of conductive material is then rolled into an elliptical shape to match the shape of the mitered enclosure ends. The insert edges are then placed to span between the spaced mitered housing ends and slightly overlap the mitered enclosure ends, and a fillet weld is made between the rolled strip and the spaced enclosures.

By using the insert or flat rolled strip of given width, a sharp corner is not created on the inside of the enclosure even if the bend is a 90° bend, so that only modest stress is introduced because of the insert.

The present invention takes advantage of the fact that the dielectric stress at the outer enclosure is much lower than the stress on the internal conductor when the conductor changes direction (usually by a factor of 2.5 to 1) so that some stress intensification can be tolerated at the enclosure. The conductor bend must be more carefully treated, however, with the simplest approach being the use of a curved section of the elongated central bus. If desired, however, a sphere could also be used to change the conductor direction as in the manner shown in U.S. Pat. No. 3,546,356.

DETAILED DESCRIPTION OF THE DRAWINGS

Figure 1:
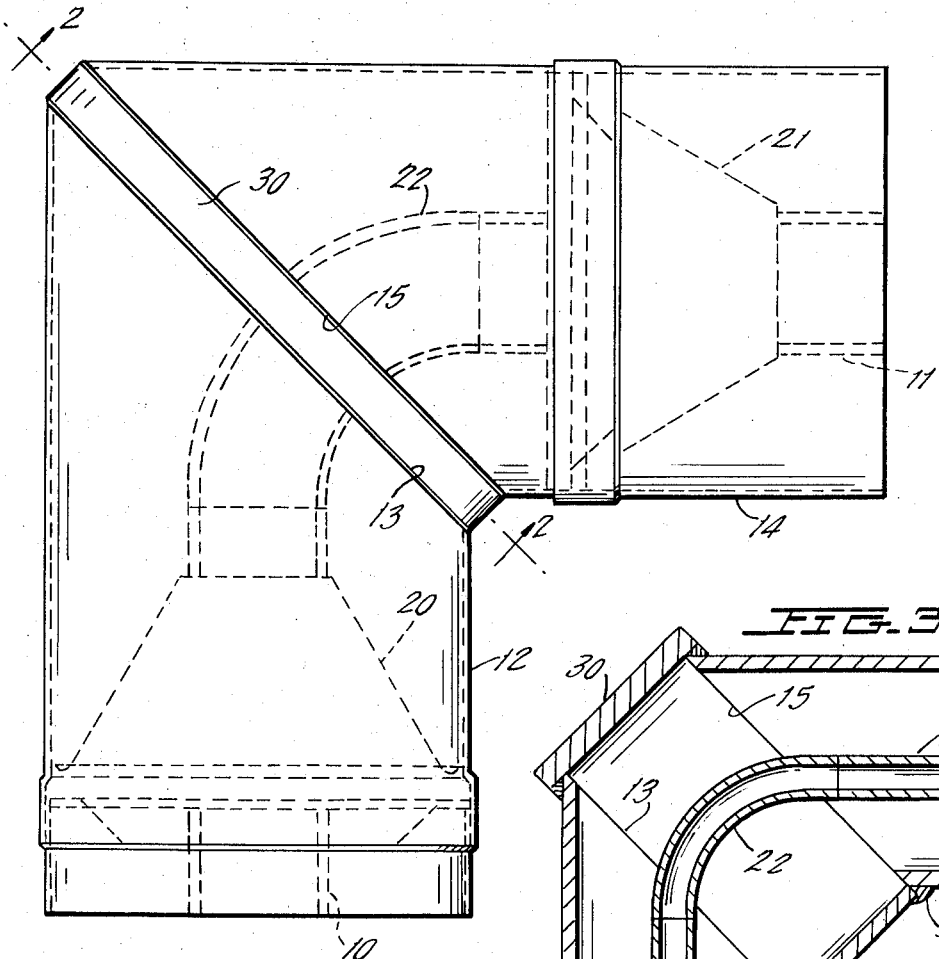
FIG. 1 is a top plan view of a gas-insulated transmission system transition joint constructed in accordance with the invention.

Referring now to the figures, there is illustrated a portion of a gas-insulated power transmission in which a central power conductor bus 10 is to change direction by 90° to emerge as a bus conductor 11. The bus 10 is enclosed in an outer grounded conductive cylindrical housing 12 which has an end portion 13 cut at a angle of 45°. In a similar manner, the bus 11 is surrounded by a conductive outer housing 14 which has an end 15 cut at 45° and spaced from and parallel to the end 13 of housing 12. In general, the bus may change direction by from about 60° to about 135°, and the housing ends will each be about one-half the angle of direction change.

The conductors 10 and 11 are then supported within their respective housing portions 12 and 14 by conical insulators 20 and 21, respecticaly. The conical insulators 20 and 21 may be constructed in the manner described in copending application Ser. No. 360,977 filed May 16, 1973, entitled CONICAL INSULATOR FOR GAS-INSULATED ELECTRICAL TRANSMISSION SYSTEM, in the name of Cronin, and assigned to the assignee of the present invention. Note, however, that insulators 20 and 21 could be replaced by disk-shaped insulators of the type shown in U.S. Pat. No. 3,546,356.

The ends of conductors 10 and 11 are then joined to one another through a smoothly curved or bent conductor section 22. Note that the bent conductor section 22 is smoothly curved to avoid the excessive concentration of dielectric stress in the conductor region. If desired, a spherical conductive section can be used to connect together the ends of straight conductor sections 10 and 11.

The spaced ends of outer housings 12 and 14 are then connected to one another by means of a flat strip of conductive material 30, which is rolled to an elliptical shape which matches the shape of the mitered ends 13 and 15 of housings 12 and 14, respectively. The insert member 30 can be fabricated from a material which has a heavier gauge than the material of enclosures 12 and 14 and, preferably, has a width greater than the separation between edges 13 and 15. Thus, the ends of the insert 30 will generally overlap the edges 13 and 15 and fillet welds 31 and 32 are used to secure the strip 30 to the housings 12 and 14, respectively.

Figure 3:
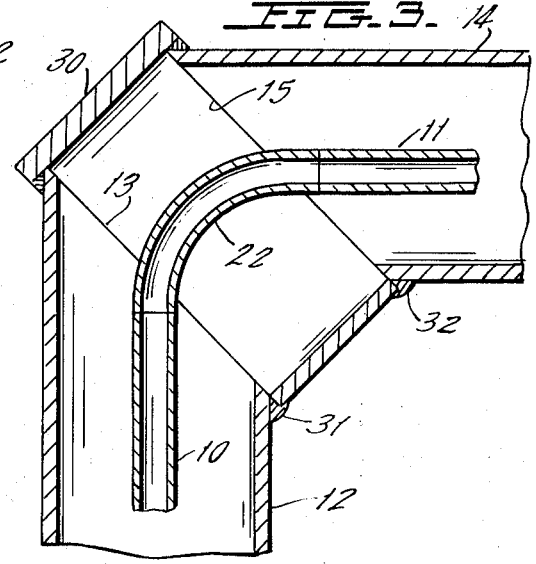
FIG. 3 is an enlarged cross-sectional view of the joint of FIG. 1 with components exaggerated in thickness to illustrate the principal of the invention.
Figure 2:
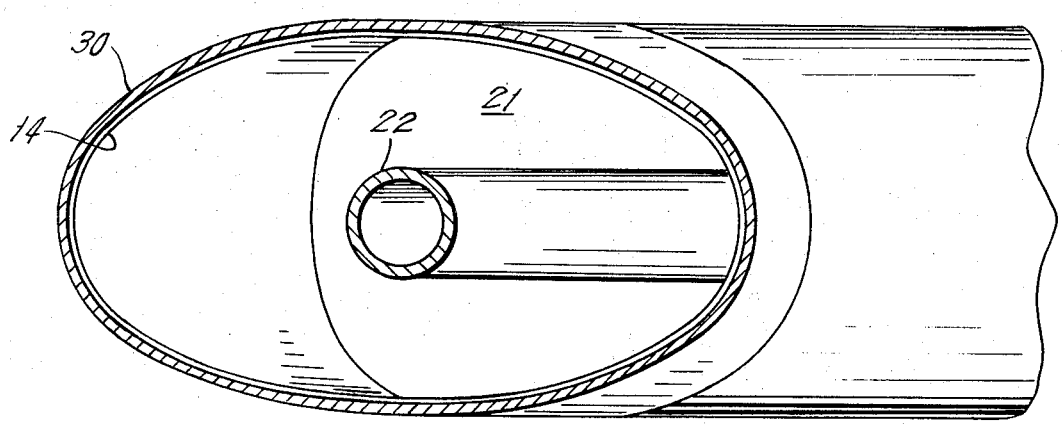
FIG. 2 is a cross-sectional view of the joint of FIG. 1 taken across the section line 2—2 in FIG. 1.

The novel system of FIGS. 1, 2 and 3, using housing diameters of about 15 inches, has been successfully tested in a 345 KV system and has successfully passed a 555 KV 60 Hz one-minute withstand test as well as a 1050 KV impulse test. The novel transition joint described has several advantages over the joint shown in U.S. Pat. No. 3,546,356 while still performing usefully in an electrical system since it is much less expensive than the arrangement shown in the patent. Thus, there is no need to stock aluminum spheres or to cut entry holes in curved surfaces which are required when following the disclosure of the patent. Moreover, the welding operation is substantially simplified and less welding is needed since it is no onger necessary to weld two hemispheres together, as in the system of U.S. Pat. No. 3,546,356.

Although this invention has been described with respect to preferred embodiments, it should be understood that many variations and modifications will now be obvious to those skilled in the art, and it is preferred, therefore, that the scope of this invention be limited, not by the specific disclosure herein, but only by the appended claims.

The embodiments of the invention in which an exclusive privilege or property is claimed are defined as follows:

1. An angle transition joint for a gas-insulated power transmission system; said power transmission system comprising first and second bus conductors, first and second outer conductive housings enclosing said first and second bus conductors, respectively, first and second insulator support means supporting said first and second bus conductors coaxially within said first and second outer conductive housings, respectively, and high pressure dielectric gas filling the interior of said first and second outer conductive housings; said first and second bus conductors being straight and having axes which intersect one another at an angle other than 180°; said tansition joint comprising a generally cylindrical conductive strip of constant width and a bus connection means having a smooth outer surface and extending between the opposing ends of said first and second bus conductors; said first and second outer housings having spaced coplanar edges which each form an angle relative to their respective axes which is other than 90°; said cylindrical strip connected at either side to and extending around the spaced coplanar edges of said first and second housings.

2. The angle transition joint of claim 1 wherein the opposite sides of said conductive strip are welded to the edges of said first and second outer housings, respectively.

3. The angle transition joint of claim 2 wherein the opposite sides of said conductive strip overlie the edges of said first and second outer housings, respectively.

4. The angle transition joint of claim 3 wherein said conductive strip has a thickness greater than the thickness of said first and second outer housings.

5. The angle transition joint of claim 2 wherein said first and second bus conductors are identical in cross-section and said first and second outer housings are identical in cross-section.

6. The angle transition joint of claim 5 wherein said first and second outer housings have a constant diameter.

7. The angle transition joint of claim 6 wherein the axes of said first and second conductors intersect one another at an angle in the range of from about 60° to about 135° and wherein said edges of said first and second housings lie in planes which form angles in the range of from about 30° to about 67.5° to their respective axes.

8. The angle transition joint of claim 1 wherein the opposite sides of said conductive strip overlie the edges of said first and second outer housings, respectively.

9. The angle transition joint of claim 1 wherein said bus connection means comprises a smoothly bent conductor of cross-section identical to the cross-section of said first and second bus conductors.

10. The angle transition joint of claim 1 wherein said conductive strip has a thickness greater than the thickness of said first and second outer housings.

11. The angle transition joint of claim 10 wherein the opposite sides of said conductive strip are welded to the edges of said first and second outer housings, respectively.

* * * * *